March 20, 1962 G. W. ANDERSEN ET AL 3,026,494

ELECTRICAL CONNECTOR BLOCK FOR INTERCONNECTING CIRCUITS

Filed Nov. 3, 1958

INVENTORS
GORDON W. ANDERSEN
JOHN L. HILL
DONALD W. MARTIN

BY Cushman, Darby & Cushman
ATTORNEYS

United States Patent Office 3,026,494
Patented Mar. 20, 1962

3,026,494

ELECTRICAL CONNECTOR BLOCK FOR INTERCONNECTING CIRCUITS

Gordon W. Andersen, Milwaukee, Wis., and John L. Hill and Donald W. Martin, St. Paul, Minn., assignors to Sperry Rand Corporation, New York, N.Y., a corporation of Delaware Filed Nov. 3, 1958, Ser. No. 771,519
5 Claims. (Cl. 339—17)

This invention relates generally to an electrical connection and has particular reference to an improved connector for electrically interconnecting the conductive terminal portions of various electronic circuits.

Heretofore, the production and servicing of electronic equipment has been severely limited by the tedious and time-consuming procedure of individually soldering each connection to establish electrical continuity between related terminals of various circuit sub-assemblies. In order to properly service the assembled components, each soldered connection would first have to be destroyed before the equipment could be disassembled and repaired. Moreover, when the necessary repairs were completed, each terminal would then have to be individually reconnected by a manual soldering operation. Since it is now possible to fabricate extremely complicated electronic circuitry by conventional circuit printing techniques, mass production of electronic equipment has been greatly simplified; but, until now, the various sub-components could not be electrically interconnected without individually soldering each electrical connection.

Accordingly, a primary object of the present invention resides in the provision of an improved electrical conneector which will automatically establish electrical continuity between related terminals of adjacent electronic sub-assemblies.

An important object of this invention is the provision of an electrical connector block which will permit selective interconnection between different groups of related conductive terminals while preventing spurious electrical contact.

A further object of the present invention resides in the provision of an electrical connector block which may be repeatedly employed to automatically reestablish electrical continuity between related terminal portions without requiring a soldering operation to resecure the electrical connection.

A still further object of this invention is to provide an interchangeable electrical contact clip which may be detachably secured to the connector block in order to simplify both assembly and replacement.

Another object of the present invention is to provide an electrical connector block which may be quickly installed to establish electrical continuity between groups of related terminal portions, which facilitates accessibility to simplify servicing, which is extremely simple in construction and thoroughly reliable in operation, relatively inexpensive to manufacture and otherwise well adapted for the purposes for which the same is intended.

Other purposes and the entire scope of the present invention will become apparent from the detailed description given hereinafter. It should be understood, however, that the detailed description and specific examples, while indicating the preferred embodiments of the present invention, are given by way of illustration only since various changes and modifications within the spirit and scope of the invention will become readily apparent as the description herein progresses.

Illustrative embodiments of this invention can be best understood with reference to the accompanying drawing which forms a part hereof, wherein.

Figures 1, 2, 3, 4, 5, 6, 7, 8, 9:
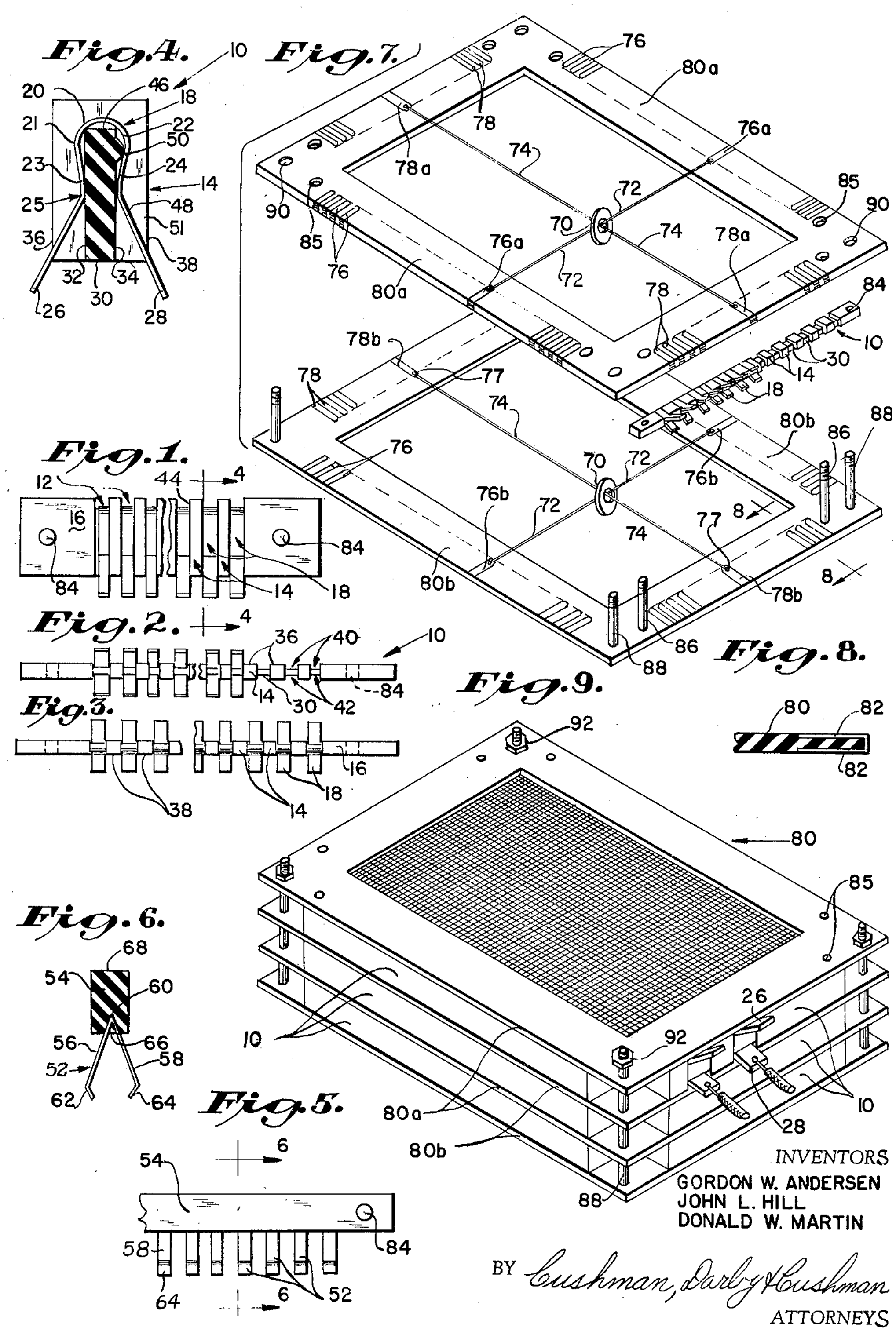
FIGURE 1 is a fragmentary top plan view of an electrical connector utilized to electrically interconnect a group of related conductive terminals.
FIGURE 2 is a fragmentary front elevational view of the electrical connector shown in FIGURE 1.
FIGURE 3 is a fragmentary rear elevational view of the connector.
FIGURE 4 is a cross-sectional view taken along the line 4—4 of FIGURE 1.
FIGURE 5 is a fragmentary top plan view of a modified electrical connector.
FIGURE 6 is a cross-sectional view taken along the line 6—6 of FIGURE 5.
FIGURE 7 is an exploded perspective view of a digital magnetic memory unit which utilizes an electrical connector constructed in accordance with the principles of the present invention.
FIGURE 8 is a sectional view taken along the line 8—8 of FIGURE 7.
FIGURE 9 is a perspective view of the magnetic memory unit shown in FIGURE 7 in an assembled and electrically interconnected condition.

Referring now to the accompanying drawing in detail, reference numeral 10 generally represents an electrical connector block preferably in the form of an elongated body of plastic or similar insulating material having, at longitudinally spaced intervals, a plurality of external contact channels or grooves 12 each of which are defined by a web portion 30 of reduced section that serves to structurally interconnect adjacent pairs of transversely extending rib portions 14 located intermediate the end sections 16 of the connector block 10. Mounted within each contact channel 12 is an individual metallic contact clip 18 which serves as a resilient spring conductor for electrically interconnecting a pair of related conductive terminal portions in a novel manner which will become readily apparent. The above features are best seen in FIGURES 1 through 4.

Each resilient contact clip 18 preferably includes a central strip 20 of curved outline in cross-section having a pair of oppositely extending leg sections 21 and 22 each of which symmetrically return to form inwardly flared intermediate portions 23 and 24 respectively that define a tapered retaining neck or throat 25 therebetween. In turn, intermediate portions 23 and 24 terminate in a pair of laterally flared forward ends to form diverging resilient contact arms 26 and 28, as illustrated in FIGURE 4. The resilient contact clips 18 preferably are constructed from a beryllium-copper alloy which is especially suitable for an electrical conductor due to its superior mechanical resilience, low electrical resistance, and relatively high thermal and electrical conductivity. However, other materials such as phosphor bronze or the like, may be employed in constructing the individual contact clips without departing from the scope of the present invention.

Upon an examination of FIGURES 1 to 4, it should be noted that each contact channel 12 preferably includes a pair of transversely extending upper and lower recesses 40 and 42 respectively which are joined by an end recess 44 to define a continuous external groove for detachably receiving and aligning the resilient contact clip 18. Since the oppositely disposed external faces 32 and 34 of the structurally interconnecting web portion 30 are spaced inwardly from the respective upper and lower outer faces 36 and 38 of adjacent rib portions 14, they will serve as supporting surfaces for detachably receiving and retaining contact clip 18.

In operation, each of the resilient contact clips 18 is individually assembled on the elongated connector block 10 by first moving the laterally flared forward ends 26 and 28 transversely along the upper and lower recesses 40 and 42 respectively to a position where the annular central portion 20 will abut against the recessed end 46 of the interconnecting web portion 30. As resilient contact clip 18 moves transversely within external channel 12, the resiliently constrictive intermediate portions 23 and 24 will straddle web portion 30 and slidably engage external supporting surfaces 32 and 34 thereof. In order to prevent accidental displacement of the resilient clip from the connector block 10, a retaining member 50, preferably in the form of a longitudinally extending ledge or lug, may be formed on either or both external supporting surfaces 32 and 34 of the interconnecting web 30 to engage the retaining neck or throat 25 of contact clip 18. In such a case, as the resiliently constrictive tapered portions 23 and 24 of the clip move simultaneously along the upper and lower recesses 40 and 42 of the connector block, the inwardly flared retaining neck 25 will flex outwardly as it passes across retaining member 50 until it rides over the longitudinally extending lug whereupon it will again resiliently engage external supporting surfaces 32 and 34 of the interconnecting web, as shown in FIGURE 4. In addition, the longitudinal distance between adjacent rib portions 14 may be proportionally dimensioned to limit any oblique movement of contact clip 18 within external channel 12 and thereby prevent spurious electrical contact between adjacent clips. In this connection, the side edges 48 of clip 18 will engage the sides 51 of adjacent ribs 14 whenever the clip becomes slightly skewed in the contact channel.

An alternative embodiment of the present invention has been illustrated in FIGURE 5 wherein the modified electrical connector includes an elongated block 54 of plastic or similar insulating material having a plurality of transversely extending resilient contact members 52 integrally embedded at longitudinally spaced intervals. Each of the metallic contact members 52 is constructed in the form of a continuous conductive strip which includes a pair of resilient contact arms 56 and 58 that are joined together at 60 within the elongated block, preferably at approximately one-third of the distance between the respective forward and rear faces 66 and 68 thereof. Contact arms 56 and 58 extend transversely beyond the forward face 66 of block 54 in symmetrical laterally diverging relation and terminate in an inwardly flared forward leg 62 and 64 respectively, which may be suitably indented to increase surface contact with the related terminal portions of the electronic circuit.

The aforementioned electrical connector blocks are primarily employed to establish electrical continuity between various sub-assemblies by electrically interconnecting related groups of conductive terminals in proper sequence. In addition, these connector blocks also serve as an insulating support for preventing spurious electrical contact between adjacent sub-assemblies when they have been assembled together in superposed relation. In this connection, the individual sub-assemblies can now be easily fabricated by conventional printed circuit techniques in the form of a generally planar layer to minimize space requirements. These planar layers usually include a supporting board or frame member of dielectric insulating material to which the various electronic sub-components are secured. For purposes of illustration, the individual sub-assembly layers will be described hereinafter in connection with a digital magnetic memory system; but it is to be understood that an electrical connector constructed in accordance with the principles of this invention could also be used with any type of electronic system where it is desirable to electrically interconnect various groups of related terminals.

Referring now more particularly to FIGURES 7, 8, and 9 of the accompanying drawing, a digital magnetic memory unit is shown and generally includes a plurality of magnetic core matrices in the form of individual planar layers 80(*a*) and 80(*b*) which preferably are assembled in superposed stacked relation. For example, a 4,096 word storage system, having a word length of 36 binary digits can be constructed by stringing a plurality of miniature toroidal magnetic cores 70 in each matrix frame 80(*a*) and 80(*b*) wherein each magnetic core element 70 is held in coordinate location by means of a horizontal drive line conductor 72 and a vertical drive line conductor 74. The drive line conductors in turn are arranged to form 64 rows and 64 columns with a toroidal magnetic core at each intersection. Opposite ends of each drive line conductor 72 are electrically interconnected to associated conductive terminal portions 76(*a*) and 76(*b*) formed adjacent the peripheral edges of the substantially rectangular support frames 80(*a*) and 80(*b*) respectively, while drive line conductors 74 are soldered at 77 to the conductive terminal portions 78(*a*) and 78(*b*) of the respective support frame, as shown in FIGURE 7. Each of the individual conductive terminals 76 and 78 include an external land or face 82 of etched copper that may be formed on either or both sides of the supporting frame 80 by a suitable printed circuit etching process. These conductive faces 82 are separated from one another and arranged in separate rows along the periphery of the supporting frame 80 in position to register with the related conductive contact of the connector block when the magnetic core matrices have been aligned in superposed relation.

Until now, the various terminals of each matrix frame 80(*a*) and 80(*b*) had to be electrically interconnected by manually soldering each individual connection; but, as illustrated in FIGURES 7 and 9, the tedious and time consuming procedure of soldering each connection to establish continuity between related drive line conductors can be avoided by utilizing an electrical connector constructed in accordance with the disclosure of this invention. In this instance, connecting block 10 shown in FIGURE 1 has been employed to both electrically interconnect and structurally support the individual matrix layers 80(*a*) and 80(*b*) in insulated superposed relation. In order to properly align the resilient contact clips 18 of the elongated connecting block 10 with the related conductive terminals of the matrix frame 80(*a*) and 80(*b*), a pair of guide holes 84 have been formed at the opposite ends 16 of each connecting block which have the same center-to-center spaced relation as the guide holes 85 formed at each corner of the matrix frame to receive an aligning pin 86. This arrangement will provide proper alignment between adjacent matrix strips when the unit is assembled, since pin 86 will pass freely through guide holes 84 and 85 of the respective insulated spacers and frames so that each of the resilient contact clips 18 will move into proper registry with the conductive face 82 of related terminal portions formed along the peripheral edge of each matrix strip. While an individual connector block can be utilized to electrically interconnect each edge of a matrix strip, it is clearly within the purview of this invention to substitute a one-piece rectangular connecting block having substantially the same outside dimensions as the matrix frame without departing from the scope of the invention.

When the individual matrix layers have been assembled in superposed aligned relation and electrically interconnected to the desired word length by interposing an electrical connector between adjacent matrix strips, the composite unit which, in the above example, would include 36 interconnected matrices, is then secured in position by bolts 88 which pass through associated apertures 90 formed at each corner of each frame and retained by threaded nuts 92. The desired pressure between the resilient conductive contacts and the related terminal portions is achieved by merely tightening nut 92 to an appropriate tension.

When the resilient contact arms 26 and 28 of clip 18 are drawn tightly against a related set of terminal portions 78(*a*) and 78(*b*), they will flex inwardly toward the interconnecting web portion 30 of the elongated block 10 until the inwardly facing surface of adjacent matrix layers 80(*a*) and 80(*b*) engage the respective outer surfaces 36 and 38 of the enlarged rib portion 14 whereupon the outwardly exerted resiliency of the conductive clip will establish a uniform and positive electrical connection with the external conductive face 82 of each terminal portion. A similar electrical connection can be obtained by interposing connector block 54 between adjacent matrix layers, but a detailed description is deemed unnecessary in view of the foregoing disclosure. Moreover, the dimensions of the connecting block can be suitably varied to insure proper insulation between adjacent strips of the assembled unit so that air will be allowed to freely circulate between the assembled subcomponents to avoid overheating.

It is also to be understood that, although several preferred embodiments of the present invention have been shown in the drawing and described with considerable particularity in the foregoing specification, the invention is not limited to the specific details of construction but includes all modifications coming within the scope of the appended claims and their equivalents.

We claim:

1. An electrical connector for electrically interconnecting relating pairs of conductive terminals comprising an elongated insulating block having a plurality of transversely extending ribs which are longitudinally spaced from one another and loacted intermediate the ends thereof, a web portion of reduced section extending longitudinally between each of said ribs to define a transversely extending recessed channel therebetween, and a detachable contact clip resiliently secured to said web portion, said contact clip having a pair of resilient conductive arms which extend transversely beyond said rib in laterally diverging relation to establish electrical continuity between a related pair of conductive terminals.

2. An electrical connector as in claim 1 wherein said contact clip includes a curved central section having a pair of oppositely extending legs which symmetrically return to define a retaining neck portion therebetween and terminate in the form of laterally diverging arms which extend outwardly beyond said rib.

3. An electrical connector as in claim 2 additionally including retaining means carried by said web portion to engage retaining neck portion of said contact clip for restricting transverse movement thereof through said channel.

4. An electrical connector comprising an elongated block of insulating material having a plurality of transversely extending rib portions located intermediate the ends thereof, said rib portions each having opposite upper and lower exterior faces, a structurally interconnecting web portion extending longitudinally between adjacent rib portions, said web portion having upper and lower supporting surfaces spaced inwardly from the respective exterior faces of said adjacent rib portions to define a pair of upper and lower transversely extending channels therewith, a detachable contact clip having a pair of resilient conductive arms located within each of said channels which resiliently engage the respective supporting surfaces of said web portion and extend transversely beyond said rib in laterally diverging relation, and retaining means carried by said web portion to detachably secure said clip to said block.

5. An electrical connector as defined in claim 4 wherein said retaining means comprises a lug member located on at least one of the supporting surfaces of said web portion in position to detachably engage said neck portion.

References Cited in the file of this patent

UNITED STATES PATENTS

| | | |
|---|---|---|
| 1,393,822 | Parker | Oct. 18, 1921 |
| 1,537,081 | Graham | May 12, 1925 |
| 2,065,651 | Burton | Dec. 29, 1936 |
| 2,694,756 | Warnke | Nov. 16, 1954 |
| 2,786,969 | Blitz | Mar. 26, 1957 |
| 2,848,706 | Besserer | Aug. 19, 1958 |
| 2,870,424 | Franz | Jan. 20, 1959 |

FOREIGN PATENTS

| | | |
|---|---|---|
| 684,579 | Great Britain | Dec. 17, 1952 |